(12) United States Patent
Sagar (10) Patent No.: US 9,122,396 B2
(45) Date of Patent: Sep. 1, 2015

(54) APPLICATION QUICK LAUNCH EXTENSION

(75) Inventor: Richard Bryan Sagar, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1620 days.

(21) Appl. No.: 11/694,068

(22) Filed: Mar. 30, 2007

(65) Prior Publication Data

US 2008/0244447 A1 Oct. 2, 2008

(51) Int. Cl.
G06F 3/048 (2013.01)
G06F 3/0489 (2013.01)
G06F 3/0482 (2013.01)

(52) U.S. Cl.
CPC ............ *G06F 3/0489* (2013.01); *G06F 3/0482* (2013.01)

(58) Field of Classification Search
CPC ........................................................ G06F 17/28
USPC ........................................ 715/810, 864, 834
See application file for complete search history.

(56) References Cited

U.S. PATENT DOCUMENTS

| | | | |
|---|---|---|---|
| 5,706,448 A | 1/1998 | Blades | |
| 5,761,610 A * | 6/1998 | Sorensen et al. | 455/558 |
| 5,798,760 A | 8/1998 | Vayda et al. | |
| 5,940,076 A | 8/1999 | Sommers et al. | |
| 5,977,969 A | 11/1999 | DiAngelo | |
| 6,014,351 A * | 1/2000 | Kinoshita et al. | 369/30.27 |
| 6,144,378 A | 11/2000 | Lee | |
| 6,448,987 B1 | 9/2002 | Easty et al. | |
| 6,760,696 B1 * | 7/2004 | Goldberg et al. | 704/201 |
| 7,487,467 B1 * | 2/2009 | Kawahara et al. | 715/810 |
| 7,493,573 B2 * | 2/2009 | Wagner | 715/864 |
| 7,546,548 B2 * | 6/2009 | Chew et al. | 715/810 |

(Continued)

OTHER PUBLICATIONS

Houser, C., "Pie Menus for All; A Portable Freely Reusable Implementation of Improved Computer Menus", The Annals of Kinjo Gakuin University, Mar. 1999, pp. 51-71, Volume of Human Sciences.

(Continued)

*Primary Examiner* — Daeho Song
(74) *Attorney, Agent, or Firm* — Norton Rose Fulbright US LLP (57) ABSTRACT

A system (and/or a method) are disclosed to launch an application directly from a menu on a screen of a handheld computing device. In one embodiment, the handheld computing device is configured to receive an event signal corresponding to executing an application assigned to the switch when actuated for a first time period. When the switch is maintained actuated for a second predetermined period of time, the system is configured to transmit an identifier corresponding to the switch to a preferences manager. The system retrieves a plurality of application identifiers from a database of the preferences manager, where each application identifier linking an executable for a corresponding application. The system displays the menu on the screen of the mobile computing device. The menu includes a plurality of application identifiers that are being selectable for execution of a different application.

15 Claims, 8 Drawing Sheets

(56) References Cited

U.S. PATENT DOCUMENTS

| | | | |
|---|---|---|---|
| 2002/0077156 A1* | 6/2002 | Smethers | 455/566 |
| 2004/0001105 A1* | 1/2004 | Chew et al. | 345/817 |
| 2004/0155908 A1* | 8/2004 | Wagner | 345/854 |
| 2005/0009571 A1* | 1/2005 | Chiam et al. | 455/566 |
| 2005/0202845 A1* | 9/2005 | Sasaki | 455/556.2 |
| 2006/0253801 A1* | 11/2006 | Okaro et al. | 715/810 |
| 2006/0272479 A1* | 12/2006 | Takatsuka et al. | 84/461 |
| 2009/0253464 A1* | 10/2009 | Yamaguchi et al. | 455/566 |

OTHER PUBLICATIONS

Callahan, J. et al., "An Empirical Comparison of Pie vs. Linear Menus", Proc. ACM CHI '88, Sep. 1987, pp. 95-100, Maryland, U.S.A.

Research Disclosure (RD) / Scientific literature disclosure (RDA), patent No. RD-0284051A, "Menu Default Setting in Data Processing System—Preselecting Field by Default Setting of Processing Unit and Changing Setting by Selecting Partic. Field and Clicking One Button," Dec. 10, 1987, 2 pages.

\* cited by examiner

APPLICATION QUICK LAUNCH EXTENSION

BACKGROUND

1. Field of the Art

The disclosure generally relates to the field of menus for mobile computing devices, for example, mobile telephones.

2. Description of the Related Art

Mobile devices, specifically mobile phone devices, today are ubiquitous. As each new generation of mobile phone devices comes to market more and more functionality is incorporated into that device. To access and navigate the functionality incorporated into a mobile phone device, conventional mobile phones have incorporated linear menus.

Generally, a linear menu is presented with a list of entries corresponding to a function. A user scrolls down through the list of entries, or taps on the item on screen (for touch screens) to minimize the number of UT interactions to access a function. Scrolling, or tapping on the screen requires more interaction from the user and requires the user to rely on visual feedback to ensure they are scrolling or tapping the appropriate place. However, linear menus have significant drawbacks. For example, a user is required to perform a number of physical interactions with their device in order to access a particular menu entry. Another drawback is that desired menu entries may be nested, therefore increasing the number of interactions necessary to reach a particular menu entry. Moreover, such entry may be difficult to locate among the myriad of menus available to the user.

To alleviate some of the drawbacks of conventional linear menus, device manufactures have incorporated dedicated physical buttons on their devices. When selected, the dedicated button executes the functionality associated with that dedicated button. Such hard wired solutions provide immediate access to common functional tasks thereby reducing the number of interactions and easing access to such function. However, this configuration too has a number of drawbacks. For example, as devices become smaller in form factor, the amount of available real estate on the device in which to put most commonly accessed functionality is significantly reduced.

Moreover, as users become more sophisticated, the number of dedicated functional buttons a user desires increases so that the limited real estates results in omissions that ultimately decreases user productivity. Further, increased user sophistication also results in different users having different views on functionality that they find most useful, and thus, most commonly accessed. To provide each different user with a different set of dedicated application buttons causes a significant increase in manufacturing cost and complexity such that it is impractical.

Thus, the art lacks a mechanism to provide quick access and flexible customization to access a variety of functional operations in devices, particularly those having small form factors.

SUMMARY

A disclosed system (and method) extends quick application launch functionality on a mobile computing device, e.g., a handheld computing device such as a mobile phone, a smartphone or the like. In one embodiment the system renders menus on a screen of the mobile that correlate with a navigation mechanism.

In one embodiment, the mobile computing device includes one or more application switches and one or more navigation switches. The application switch is configured to include application switches (or buttons) that when depressed and immediately released (e.g., an initial time period) immediately launch (or execute) an application. When the application switch is depressed for a time period greater than the initial time period, an event manager detects the depression of that application switch for that predetermined time period and generates a switch identifier corresponding to the application switch.

A preferences manager receives the switch identifier and, in response, retrieves a plurality of application identifiers corresponding to that application switch. Each application identifier linked (e.g., a pointer or a batch command) to an executable for a corresponding application. A menu engine displays each application identifier in a menu on the screen. Each application identifier is selectable for execution so that when it is selected, e.g., by the navigation mechanism, it launches the corresponding application.

In one example embodiment, a mobile computing device (e.g., a personal digital assistant or a smart phone) has a form factor that allows for holding within a palm of a user. The mobile computing device in this example embodiment integrates at least one application button and a five-way navigation mechanism. Each application button is directly mapped to a specific application. For example, the application button may be assigned to a calendar function so that when it is depressed and immediately released (e.g., an initial time period) the calendar application immediately launches (executes).

By depressing and holding the calendar application button for a longer period of time (e.g., a predetermined time period that is greater than the initial time period), a menu is rendered that allows a user to select additional applications for execution (e.g., a calculator, a task list, an alarm, and a help application). In one example embodiment, the menu visually maps with the five-way navigation mechanism as a pop-up that graphically shows a relationship as a two-dimensional map.

In this configuration, the four additional applications are shown at four menu items arranged in a circular or pie configuration. In this example configuration, the calculator is an item in a "north" or "up" (or "top") location, the task list as an item in the "east" or "right" location, the alarm as an item in the "west" or "left" location, the help as an item in the "south" or "down" (or "bottom") direction. By mapping the menu in this configuration with the five-way navigation a user can with a finger or thumb can select each entry by selecting the corresponding location on the five-way navigation and then launch or execute the selected item by pressing the appropriate direction on the navigation or pressing and releasing a center button within the five-way navigation mechanism.

The disclosed example configuration has a number of advantages. For example, it eases access to a wider range of applications without a need to traverse multiple menus. The configuration also provides for ease of navigation within a menu. Moreover, it is customizable so that user's can assign menu options corresponding to applications (or functions) most frequently accessed by them.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying drawings, in which:

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles disclosed herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles disclosed herein.

Example Mobile Computing Device

FIGS. 1a-1d illustrate one embodiment of a mobile computing device with telephonic functionality, e.g., a mobile phone or a smartphone. The computing device is configured to host and execute a phone application for placing and receiving telephone calls. It is noted that for ease of understanding the principles disclosed herein are in an example context of a mobile computing device with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) or data networks having voice over internet protocol (VoIP) functionality.

Figure 1A:
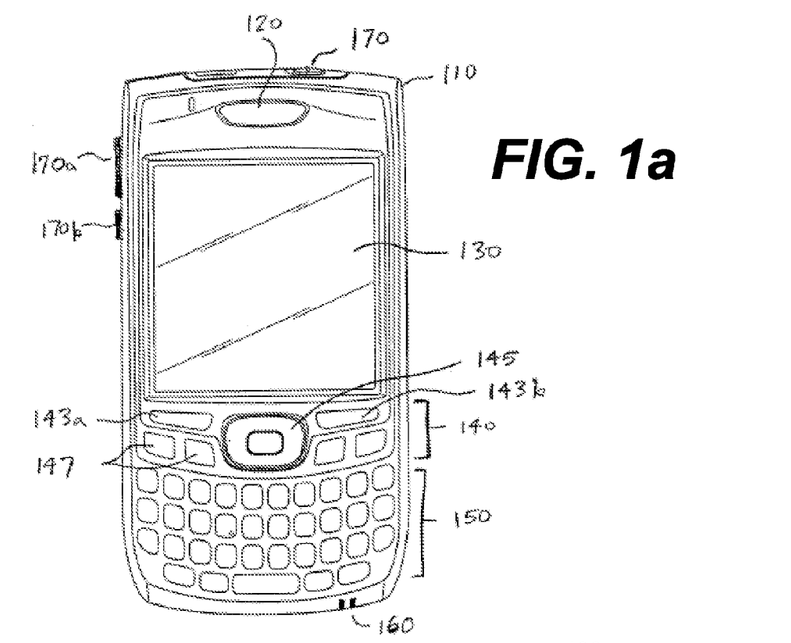
FIGS. 1a-1d illustrate one embodiment of a mobile computing device with telephonic functionality, e.g., a handheld computing device such as a smart phone.
Figure 1B:
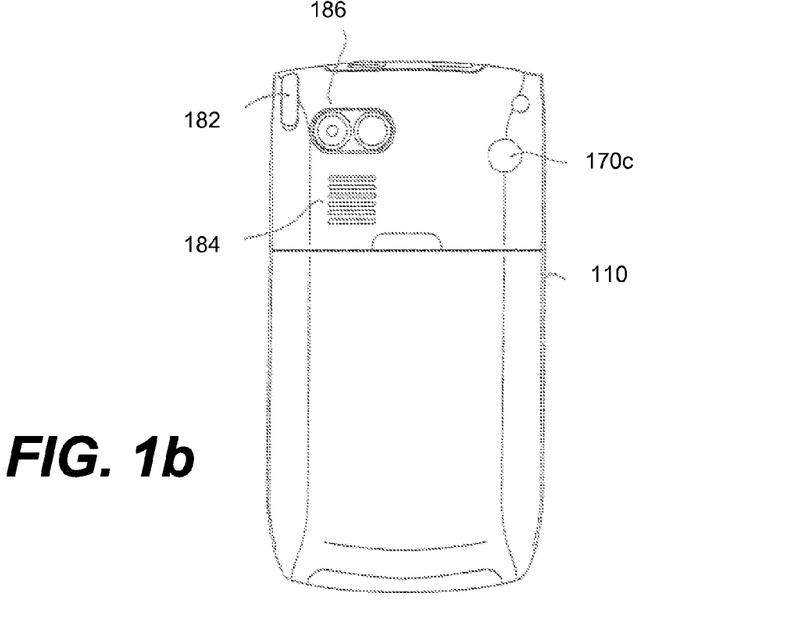
Figure 1C:
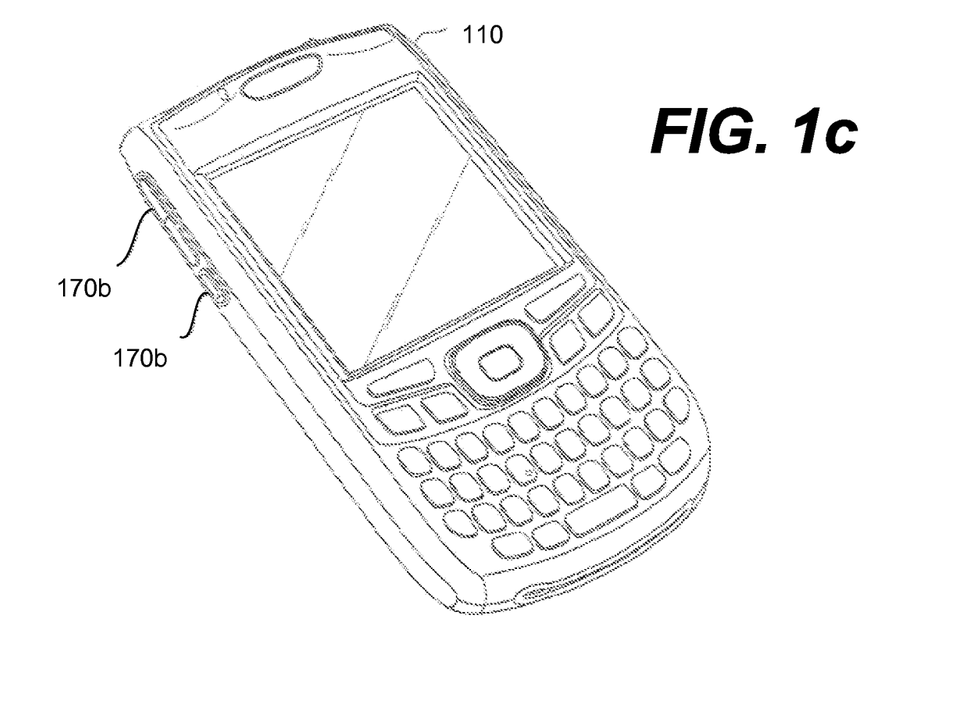

FIGS. 1a through 1c illustrate embodiments of a mobile computing device 110 in accordance with the present invention. As illustrated through a front face view in FIG. 1a, the mobile computing device 110 is configured to be of a form factor that is convenient to hold in a user's hand, for example, a personal digital assistant (PDA) or a smart phone form factor. For example, the mobile computing device 110 can have dimensions that range from 3 to 6 inches by 2 to 5 inches by 0.25 to 0.85 inches and weigh between 2 and 8 ounces.

The mobile computing device 110 includes a speaker 120, a screen 130, a navigation area 140, a keypad area 150, and a microphone 160. The mobile computing device 110 also may include one or more switches 170a-c (generally 170). The one or more switches 170 may be buttons, sliders, or rocker switches and can be mechanical or solid state (e.g., touch sensitive solid state switch).

The screen 130 of the mobile computing device 110 is, for example, a 240×240, a 320×320, or a 320×480 transflective TFT color display that includes touch screen or inductive pen support. The navigation area 140 is configured to control functions of an application executing in the mobile computing device 110 and visible through the screen 130. For example, the navigation area includes an x-way (x is e.g., 5) navigation ring 145 that provide cursor control, selection, and the like. In addition, the navigation area 140 may include selection buttons 143 to select functions viewed just above the buttons on the screen 130. In addition, the navigation area also may include dedicated function buttons 147, e.g., for functions such as calendar or home screen. In this example, the navigation ring 145 may be through mechanical, solid state switches, dials, or a combination thereof. The keypad area 150 may be a numeric keypad (e.g., a dialpad) or a numeric keypad integrated with an alpha or alphanumeric keypad 160 (e.g., keyboard with consecutive keys of QWERTY, AZERTY, or other equivalent set of keys on a keyboard).

Although not illustrated, it is noted that the mobile computing device 110 also may include an expansion slot 125. The expansion slot 125 is configured to receive and support expansion cards (or media cards), which may include memory cards such as CompactFlash™ cards, SD cards, XD cards, Memory Sticks™, MultiMediaCard™, SDIO, and the like.

FIG. 1b illustrates a rear-view of the example mobile computing device 110. The rear-view illustrates additional features of the mobile computing device, including, a stylus housing (for holding a stylus) 182, a second speaker (e.g., for speaker phone functionality) 184, and a camera 186. Also illustrated is another switch 170 that can be used to control functions, such as the ones further described below, of the mobile computing device 110.

Figure 1D:
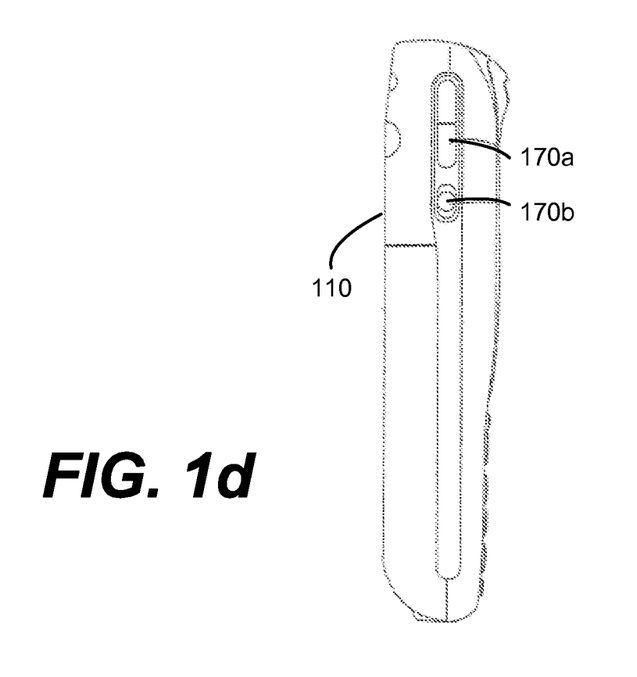

In addition, FIG. 1c illustrates a perspective view of the mobile computing device 110. FIG. 1d illustrates a side view of the mobile computing device 110. The views in FIGS. 1c and 1d provide additional visual details of example switches 170 for use with applications running on the mobile computing device 110. For example, one switch can be a rocker switch 170a while another can be a push button switch 170b. Again, it is noted that these switches can be configured as mechanical switches or solid state switches.

Example Mobile Computing Device Architectural Overview

Figure 2:
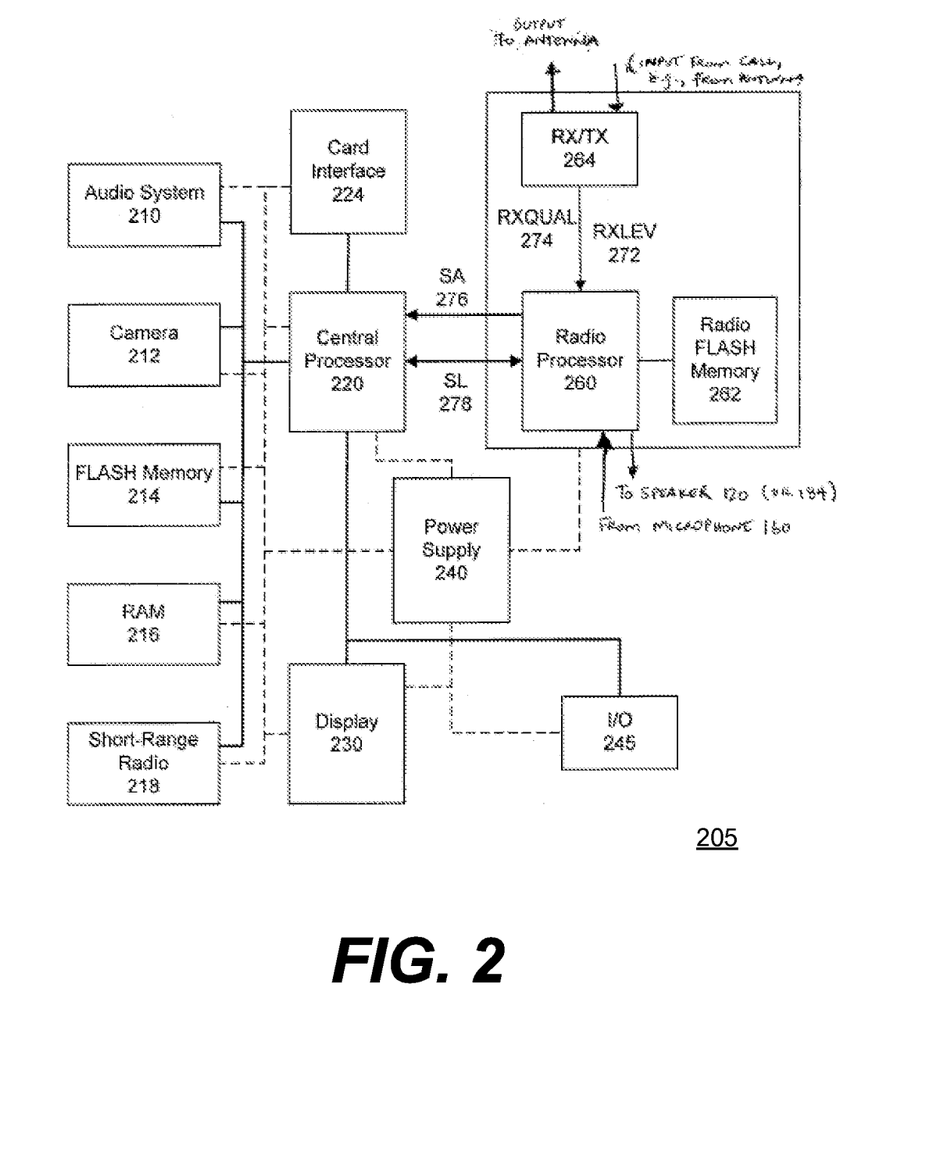
FIG. 2 illustrates one embodiment of an architecture of a mobile computing device.

Referring next to FIG. 2, a block diagram illustrates one embodiment of an architecture 205 of a mobile computing device, e.g., 110, with telephonic functionality. By way of example, the architecture illustrated in FIG. 2 will be described with respect to the mobile computing device of FIGS. 1a-1d. The computing device 200 includes a central processor 220, a power module 240, and a radio subsystem 250. The central processor 220 communicates with: audio system 210, camera 212, flash memory 214, RAM memory 216, and short range radio module 218 (e.g., Bluetooth, Wireless Fidelity (WiFi) component). The power module 240 powers the central processor 220 and the radio subsystem 250. The power module 240 may correspond to a battery pack (e.g., rechargeable) or a powerline connection or component. Other components that communicate with the processor 220 and which are powered by power module 240 include a screen driver 230 (which may be contact or inductive-sensitive) and one or more input/output (I/O) mechanisms 245 (e.g., buttons 147, keyboards 160, slider switches, rocker switches 170*a*, push button switches 170*b*, touch sensitive switches, photo switches, etc.).

In one embodiment, the I/O mechanisms 245 are configured (or structured) to receive input corresponding to user activity, for example, one or more switch mechanisms through triggering (or toggling) of a switch from one state to another through actuation, induction, photo or optical sensing, pressure sensing, or the like. The I/O mechanism 245 detects, for example, switch activity associated with the navigation area 140 such as the selection buttons 143, dedicated function buttons 147, or the navigation ring 145. The I/O mechanism 245 includes switches for at least one of the dedicated function buttons 147, which may be dedicated to immediately launch an application, e.g., a calendar program or an email program, upon triggering (e.g., actuation or other state change). Another I/O mechanism 245 includes the navigation ring 145, which can be structured as a single switch with four points where the switch may be toggled (e.g., left side of ring, right side of ring, top of ring, or bottom of ring) or it could be structured to include four separate switches (e.g., also left side of ring, right side of ring, top (or up) of ring, or bottom (or down) of ring). Note that the navigation ring 145 can be circular, oblong, oval, square, or rectangular with respect to its structure.

The radio subsystem 250 includes a radio processor 260, a radio memory 262, and a receiver (Rx)/transmitter (Tx) 264. The receiver (Rx)/transmitter (Tx) 264 may be two separate components or a single component. In either instance, it also may be referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, multiple Access (CDMA system), and a Universal Mobile Telecommunications System (UMTS). Examples of data networks include General Packet Radio Service (GPRS), third-generation (3G) mobile, High Speed Download Packet Access (HSDPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using a serial line 278.

In one embodiment, central processor 220 executes logic (by way of programming, code, instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

Menu System

Figure 3:
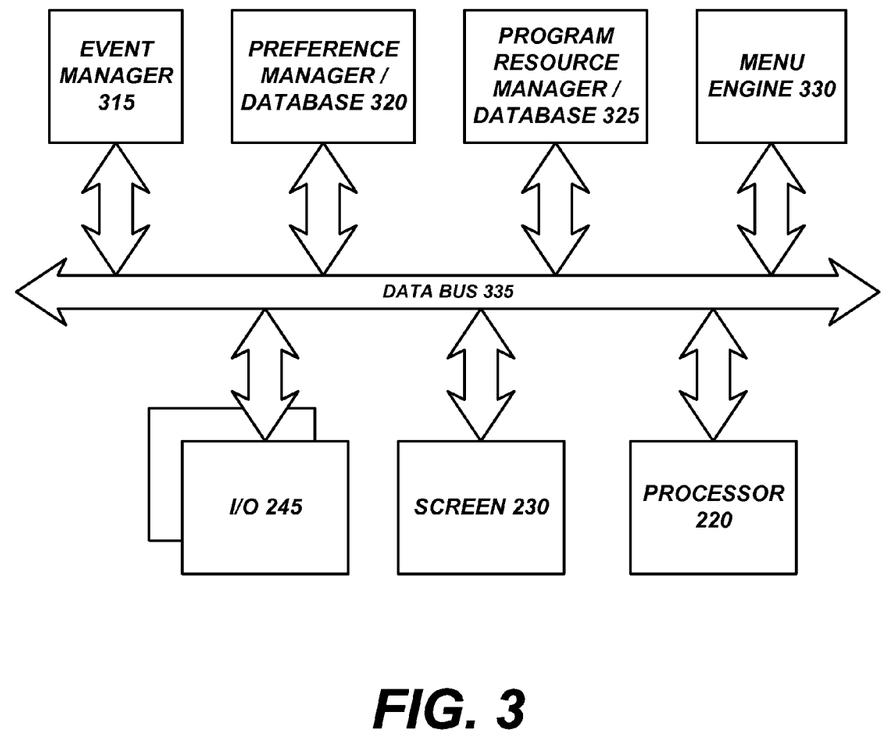
FIG. 3 illustrates one embodiment of a menu serving architecture, for example, in a mobile computing device.

FIG. 3 illustrates one embodiment of a menu serving architecture, for example, in a handheld computing device 110. The architecture includes an event manager 315, a preferences manager and database (or file) 320, a program resource manager and database (or file) 325, and a menu engine 330. These components may be embodied in software, hardware, or a combination thereof. In this configuration, these components communicatively couple with the device components, including one or more I/O mechanisms 245 (e.g., one or more switch detection mechanisms 310*a-n* (generally 310)), the screen 230, and the central processor 220. The central processor 220 is configured to execute instructions for software embodiments corresponding to the components within the system. A data bus 335 communicatively couples the menu serving architectural components and the other device components, e.g., the processor 220 or I/O mechanism 245.

The event manager 315 is configured to detect depression of one of the application switches for a predetermined time period and configured to generate a switch identifier corresponding to one or more I/O mechanisms 245, e.g., an application switch. A preferences manager 320 is configured to receive the switch identifier from the event manager 315. In response, the preferences manager 320 retrieves a one more application identifiers corresponding to the application switch from its database. Each application identifier is linked to an executable for a corresponding application. The linking may include a pointer or the executable itself.

Once the application identifiers are retrieved by the preferences manager 320, the menu engine 330 is configured to render a menu with the application identifiers on the screen 230. In one embodiment, the menu engine 330 is configured to display each application identifier in a menu shaped in a "pie" configuration. Each menu item (e.g., portion) of the menu corresponds with each application identifier and is selectable. Selection of particular menu item allows for direct execution of the application associated with the application identifier. In addition, in one embodiment program resource manager 325 is configured to store an icon for each application identifier/corresponding application. The menu engine 330 either retrieves or is sent the icon for integration into the menu that will be displayed on the screen 230.

Figure 4:
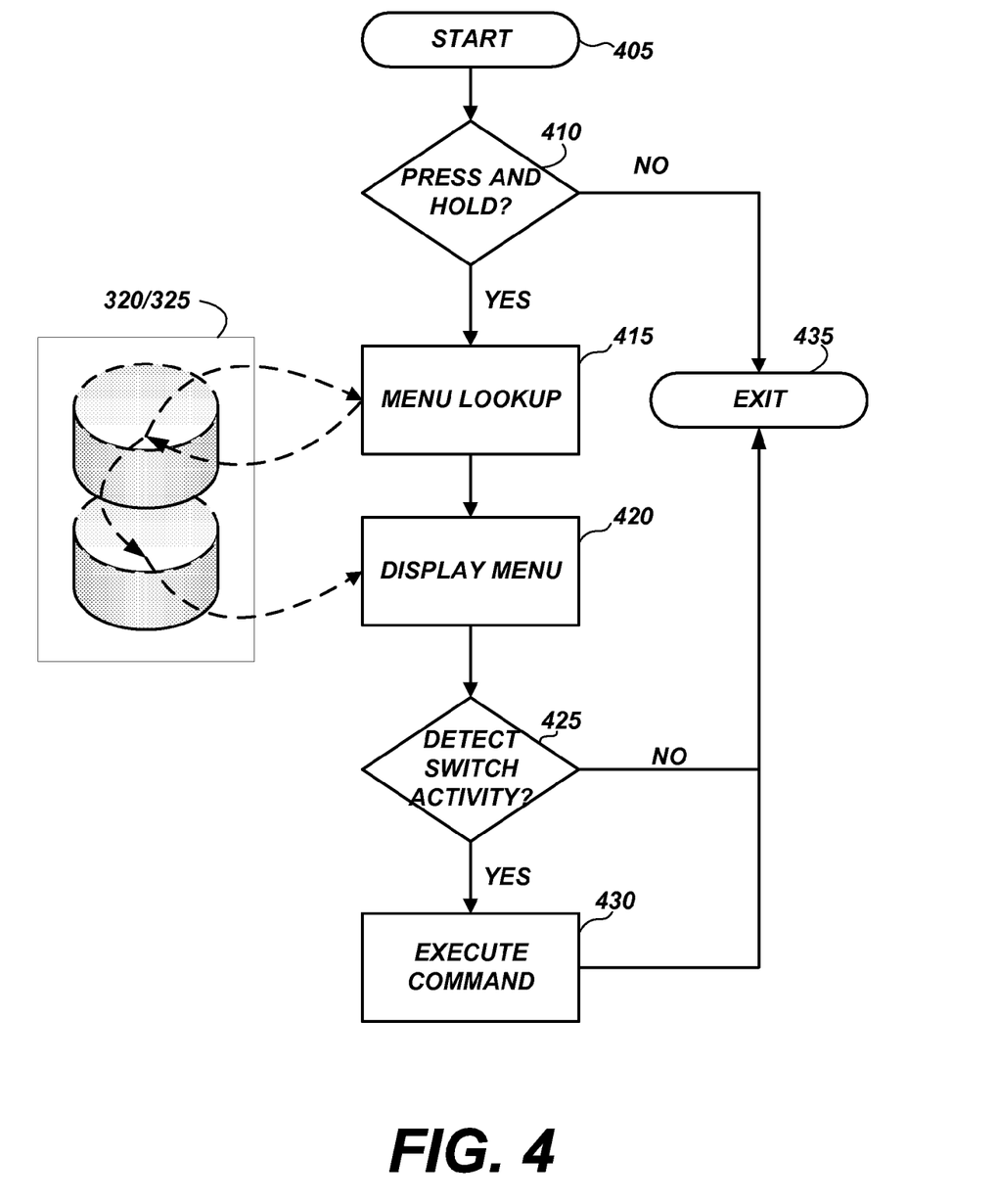
FIG. 4 illustrates one embodiment of a process for serving a menu and executing a menu item, for example, in a mobile computing device.

FIG. 4 illustrates one embodiment of a process for serving a menu and executing a menu item, for example, in a mobile computing device. For ease of discussion and illustration, this example embodiment of the process is described in the context of the handheld computing device 110 and corresponding architecture 205. In addition, reference also is made to FIGS. 5*a* and 5*b*.

Figure 5A:
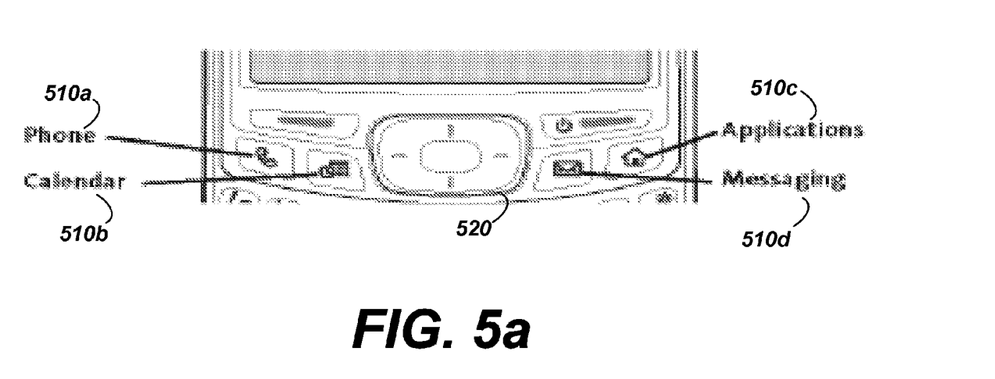
FIGS. 5a and 5b illustrates one embodiment of a navigation mechanism on a mobile computing device and one embodiment of a corresponding software navigation menu.

FIG. 5*a* illustrates one embodiment of the navigation area (or navigation mechanisms on, e.g., the handheld computing device). The application switches (or buttons) are functionally similar to the application switches 147 described previously. In this example the application buttons are for a phone application 510*a*, a calendar application 510*b*, a home or applications menu 510c, and a messaging (e.g., electronic mail or short messaging service (SMS)) application 510d. Also illustrated is a navigation ring 520 similar to the navigation ring 145 described above. In this example, the navigation ring 520 allows for movement in a left, right, up, and down direction within a display on the screen 130. The center of the navigation ring 520 includes a button that can be used to select a particular entry that may be highlighted within a display on the screen 130. In one embodiment, the navigation ring mechanism may be referred to as a five-way navigation mechanism.

Referring back to FIG. 4, the process starts 405 with a determination of whether one of the application switches (or buttons), e.g., calendar 510b, has been pressed and held 410 for greater than a predetermined length of time. Note that if the user simply presses and immediately releases (an initial time period) the application switch 510b, the application assigned to that switch, i.e., the calendar application in this example, will immediately launch so the process exits 435. However, when the application switch 510b is held longer than this initial time period, the event manager 315 detects additional activity corresponding to menu generation.

The event manager 315 looks up (or accesses or notifies) 415 the preferences manager 320 to perform a menu lookup by sending a switch identifier that identifies the corresponding switch, i.e., the calendar switch 510b in this example, that was depressed and held. The preferences manager 320 receives the switch identifier and in its database determines which applications correspond with the calendar application switch 510b. Specifically, the preferences manager 320 retrieves a one more application identifiers corresponding to the calendar application switch 510b from its database. Each application identifier is linked to an executable for a corresponding application. The linking may include a pointer to the application executable or the executable itself.

In addition, optionally, the preferences manager 320 instructs the program resource manager 325 to provide (or serve or supply) an icon corresponding to each application or application identifier. The program resource manager 325 retrieves the icon information from its database and forwards it back to the preferences manager 320 or onto the menu engine 330. The menu engine receives the application identifier information from the preferences manager 320 as well as the icons information from the program resource manager 325. The menu engine 330 either retrieves or is sent the icon for integration into the menu that will be displayed on the screen 130. In particular, the menu engine 330 configures a particular layout for a menu. The layout includes a bounded area that is less than a size of the screen 130 and will be rendered on top or in front of a presently active display (e.g., one a user is interacting with on the screen 130 of a handheld computing device 110). Examples of a menu layout include a pie (e.g., square, rectangle, round, or oval) with "slices" or a racetrack (oblong) with segments. The menu engine 330 displays (or renders) 420 that menu on the screen 130 on top or in front of the presently active display.

Figure 5B:
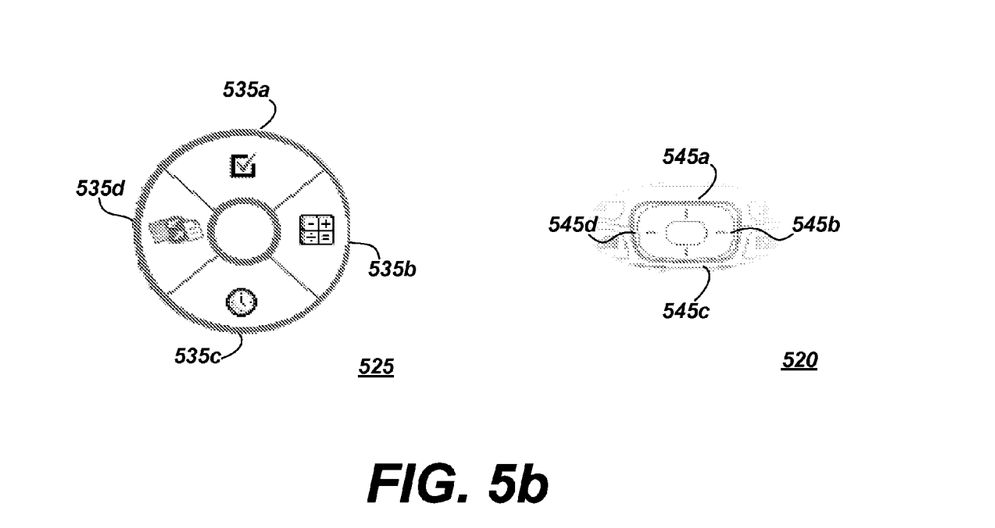
Figure 6:
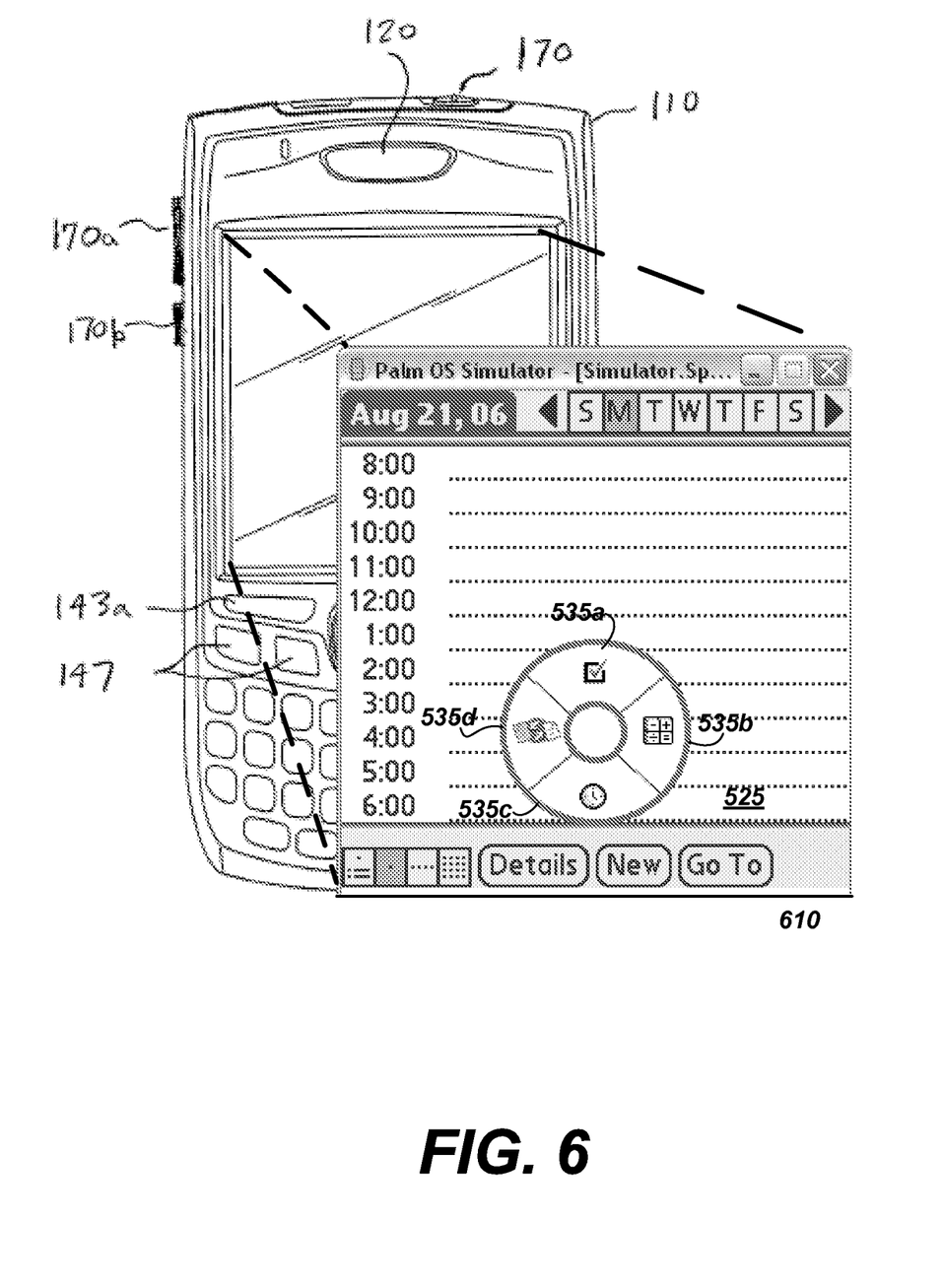
FIG. 6 illustrates one embodiment of a served menu rendered on a screen of a mobile computing device.

FIG. 5b illustrates one example of the displayed pie menu 525 corresponding to the pressed and held (for a predetermined time period greater than initial time period) calendar application button 510b. The rendered menu shows each menu item 535a-d, e.g., the slice or segment, as a selectable item. The selectable items include a task/to do application 535a, a calculator application 535b, an alarm application 535c, and a synchronization application 535d. FIG. 6 illustrates the served menu rendered on the screen 230 of the handheld computing device 110 against a context of a calendar application 610. In one example context, this configuration may appear where a user seeks to access a task application corresponding to a particular calendar entry and desires to directly launch the application rather than search for it in nested menu lists.

In one embodiment, the rendered menu 520 may be displayed with one of the menu items pre-selected (e.g., different shade for menu item, bolded border of menu item, etc.). By actuating the center button on the navigation ring 520, that selected application can be immediately launched (or executed). If another selection is desired rather than the pre-selected option, the navigation ring 520 can be used to traverse between the menu items. For example, if the task application 535a is pre-selected and the alarm application 535c is desired, a right portion (or part) 545b of the navigation ring 520 can be triggered (pressed and immediately released) twice to move the selection to the alarm application 535c via the calculator entry 535b. Alternatively, a down (or bottom) portion 545c of the navigation ring 520 can be selected to jump directly from the task application 535a to the alarm application 535c.

Note that each move highlights the current selection that would be executed if the center button of the navigation ring 520 were triggered. Alternatively, the process can be configured so that pressing a corresponding direction, e.g. on the navigation ring, immediately executes (or launches) the application assigned to that direction. By allowing for execution by directly navigating to the appropriate application identifier within the menu, it further reduces the number of steps to execute an application.

Once at the alarm application 535c, it will be highlighted and the center button of the navigation ring 520 can be triggered to execute the alarm application 535c. By way of example, this process of selecting the alarm application 535c corresponds in FIG. 4 to detection 425 of the selection activity and execution (or launch) 430 of the selected menu item before exiting 435 the process.

Although the disclosure describes operation in the context of an application button, e.g., 510b, and a navigation mechanism, e.g., 520, the principles disclosed need not be limited to these particular embodiments. For example, a device may be configured to include a function key that toggles keys in a keyboard, which has in one row the Q-W-R-T-Y keys, into a selection and navigation configuration. In such example, depressing and releasing a function key for at least a predetermined time period may have an '*' key or '#' key serve as an application button. In addition, in this example, the 'D' key (left), the 'R' key (up or top), the 'G' key (right) and the 'C' key (down or bottom) would function as directional elements and the 'F' key or an 'enter' key may function as launch (or execute) keys.

In one embodiment the disclosed configuration increases the number of applications available to immediately launch a particular application without having to search for those applications within nested menu lists. Moreover, availability of the applications for immediate execution is brought directly to the user's attention without having to search groupings of applications to find the particular application to launch. Overall, this increases this reach of dedicated user buttons by a multiples factor. For example, one calendar application button 510b now becomes one calendar application button 510c plus four additional applications 535a-d with a single action of pressing and holding the calendar button 510b.

To further help ease navigation, in one embodiment, the menu is configured to "mirror" or correspond with the navigation mechanism. For example, referring back to FIG. FIG. 5b, the pie menu 525 is illustrated in comparison with the five-way navigation mechanism (navigation ring) 520. The menu items 535a-d of the menu 525 in this example, correspond to a corresponding location, e.g., 545a-d, on the navigation ring 520. This configuration further eases use by helping to make navigation among the menu items intuitively and quickly. For example, it decreases the number of steps necessary to directly launch an application from the menu 525 when the corresponding portion of the navigation ring 520 is simply selected before the center of the navigation ring 520 is pressed and released to launch that application.

Although in one embodiment the menu items (i.e., the application identifiers) are disclosed as mapping to physical keys or switches, still additional alternative embodiments of an extended menu system may be implemented using the principles disclosed herein. For example, rather than map to physical keys or switches, the menu items (i.e., the application identifiers) may themselves take on physical characteristics. In one example embodiment, the screen 120 (230) may be an enhanced touch sensitive screen that provides haptic feedback. Thus, in this embodiment when the menu is rendered, the menu items themselves will have or provide a tactile feel or response so that the user can "feel" each item as a button. Each of these tactile buttons may be configured so that it accepts a selection from a user (e.g., the user can depress or press on the button) and in response the selected application will be launched. To help ease interactions in such embodiments, the menu boundary area may be structured similar to the navigation area so that the rendered application buttons on the screen 130 are located in areas similar to the physical application buttons. By way of example, four application buttons may be rendered on the screen 130, are each above each of the four physical application buttons, e.g., 510a-510d.

A benefit of the haptic enabled alternative embodiment is that it provides physical-type feel for a user when that user interacts with the device. Thus, the number of physical application buttons in this configuration can be extended without a need for additional device real estate for physical buttons. This increases access and availability to applications within the handheld computer device.

The disclosed embodiments for an extended menu system beneficially are configurable. FIGS. 7a-7e illustrate one embodiment of displayed screen shots used to configure a menu to serve and render on a screen of a mobile computing device. By way of example, reference will be made to the menu described in FIGS. 5a, 5b, and 6. In FIGS. 7a-7d, a starter application applet is configured to include a location on the menu 710, a list of applications 715, and soft application buttons 720 that correspond to corresponding application switches, e.g., 147 (510a-510d), on the handheld computing device 110.

Figure 7A:
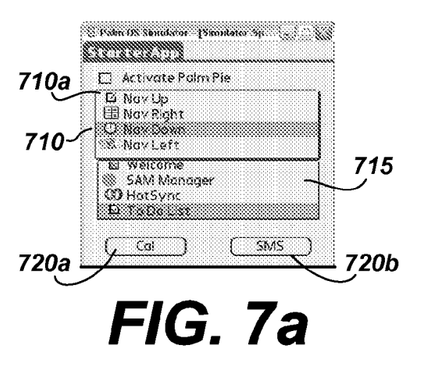
FIGS. 7a-7e illustrate one embodiment of displayed screen shots used to configure a menu to serve and render on a screen of a mobile computing device.

To start the assignment process, in FIG. 7a, a user would select a location on the menu where an application will be assigned. In this example, the pie menu 525 has four menu items locations identified as "Nav Up", "Nav Right", "Nav Down", and "Nav Left" (collectively 710) and the user selects one, e.g., "Nav Up" 710a. It is noted that this example illustrates how the pie menu is configured to closely reflect positioning on the navigation ring, e.g., 520, in that the menu locations correspond with the navigation ring 520 locations.

Figure 7B:
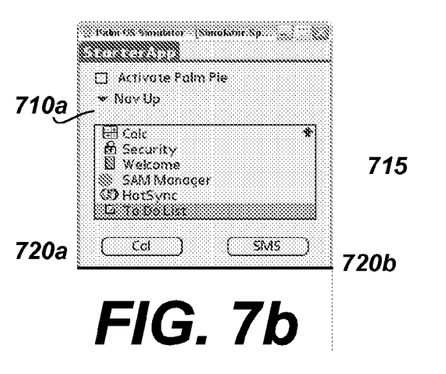

In FIG. 7b, the user then selects an application from the list 715, e.g., "To Do List", to display in the pie menu, e.g., 525, at the selected location of "Nav Up" 710a. The user in this example then assigns an application button on the handheld computing device 110. Specifically, the user selects the soft application button, e.g., 720a or 720b, corresponding to the physical button, e.g., calendar application button 510b or a message application button 510d, to which to associate the menu. In this example, the user selects the "Cal" soft button 720a to assign to the calendar application button 510b on the handheld computing device 110. In one embodiment of this process, when this is done the menu pops up as shown in FIG. 7c, providing a preview of what will show for display on the screen 130 of the device 110 when the calendar application button 510b is depressed and held for a predetermined time period.

Figure 7C:
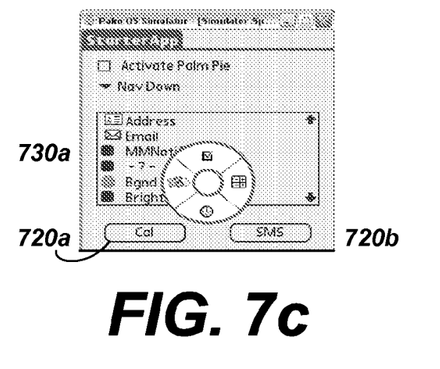
Figure 7D:
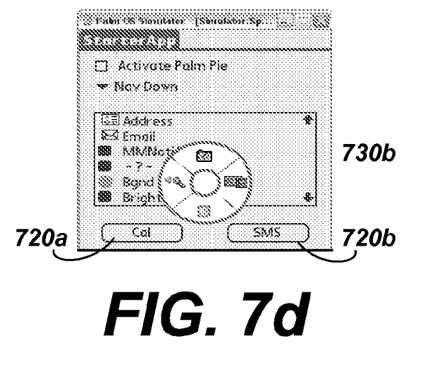
Figure 7E:
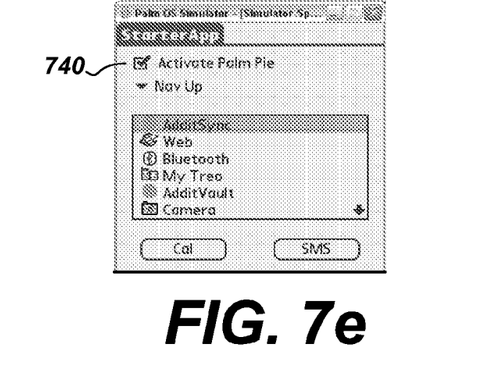

FIGS. 7c and 7d also can be used to describe an embodiment in which a menu associated with a physical key on the handheld computing device 110 can be previewed. In particular, a user selects the application soft keys 720a, 720b corresponding to the physical button the user seeks to preview to have displayed the menu and options for that physical button. In this example, the "Cal" soft application button 720a shows a first menu with a first set of menu items that correspond to executable applications available through the physical calendar application button 510b. The "SMS" soft application button 720b shows a second menu with a second set of menu items that correspond to executable applications available through the physical messaging application button 510d. Once the keys have been assigned, a user can elect to activate or not active the menu by selecting or deselecting a corresponding selection box 740 as shown in FIG. 7e.

It is noted that in one embodiment, the selection of applications to populate the menu items, e.g., 535a-535d, may be accomplished in a 'semi-automatic' manner. For example, menu items presented as a result of press and hold of the messaging button 510d (the "✉" key) correspond to applications that are messaging in nature, e.g., electronic mail (e-mail), chat, voice (e.g., voice over IP), and blogging applications. Alternatively, if the messaging application button 510d was re-assigned by the user to another category, e.g., multimedia, the four pie menu options change to four applications corresponding to that category, voice memo, camera (still and/or motion), audio player, and video player.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for an apparatus and a process for an quick launch extension through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system for rendering menus on a screen of a handheld computing device, the system comprising:
   a plurality of switches, each switch configured to perform a function in response to the switch being activated for less than a predetermined time period;
   an event manager configured to generate one of a plurality of switch identifiers corresponding to one of the plurality of switches in response to the one of the plurality of switches being activated for at least the predetermined time period;
   a database storing sets of application identifiers, each set of application identifiers corresponding to each of the switch identifiers;
   a navigation mechanism configured to receive user input representing one of at least three directions;
   a preferences manager configured to retrieve a set of application identifiers from the database corresponding to the one of the plurality of switch identifiers responsive to receiving the one of the plurality of switch identifiers, each application identifier linked to launch an executable; and
   a menu engine configured to render a menu on the screen in response to the preference manager retrieving the set of application identifiers, the menu including the set of application identifiers within a bounded area, wherein the set of application identifiers are placed in relative orientations corresponding to relative orientations of the at least three directions that can be navigated by a navigation mechanism, an executable corresponding to a selected application identifier launched in response to receiving user input at the navigation mechanism indicating a direction corresponding to a relative orientation of the selected application identifier.

2. The system of claim 1, further comprising a program resource manager configured to store and serve icons corresponding to the set of application identifiers for the menu.

3. The system of claim 1, wherein the switches comprise a preconfigured application button.

4. The system of claim 1, wherein the navigation mechanism comprises a switch assembly structured for navigation in a first direction, a second direction, a third direction and a fourth direction.

5. The system of claim 4, wherein the switch assembly further comprises an execution switch to execute the selected application identifier.

6. The system of claim 1, wherein the switch comprises a combination of a function key activated for at least a predetermined time period and a predetermined key of a keypad.

7. The system of claim 6, wherein the navigation mechanism further comprises a first key, a second key, a third key and a fourth key of a keypad, the first key corresponding to a first direction and a second key corresponding to a second direction, the third key corresponding to a third direction, the fourth key corresponding to a fourth direction, the first key and the second key located along a first axis, the third key and the fourth key located along a second axis that is substantially perpendicular to the first axis.

8. The system of claim 1, wherein the handheld computing device comprises a smartphone device or a personal digital assistant device.

9. A method for displaying menus on a screen of a handheld computing device, the method comprising:
   performing a function in response to activating one of a plurality of switches for less than a predetermined period of time;
   transmitting a switch identifier corresponding to the switch in response to the one of the plurality of switches activated for at least the predetermined period of time;
   storing sets of application identifiers in a database, each set of application identifiers corresponding to each switch identifier;
   retrieving a set of application identifiers from the database corresponding to the transmitted switch identifier in response to receiving the transmitted switch identifier, each application identifier corresponding to an executable;
   rendering a menu on the screen of the handheld computing device in response to retrieving a set of application identifiers, the menu including the plurality of application identifiers within a bounded area, wherein the plurality of application identifiers are placed in relative orientations corresponding to relative orientations of at least three directions that can be navigated by a navigation mechanism; and
   launching an executable corresponding to a selected application identifier in response to receiving user input at the navigation mechanism indicating a direction corresponding to a relative orientation of the selected application identifier.

10. The method of claim 9, further comprising retrieving icons corresponding to the set of application identifiers for displaying in the menu.

11. The method of claim 9, wherein further comprising selecting an application identifier from the set of application identifiers in response to receiving a selection signal from a navigation switch, the application identifier being highlighted until selection of an adjacent application identifier in response to a subsequent selection signal to cause the adjacent selection signal to be highlighted.

12. The method of claim 9, wherein the navigation mechanism comprises a five-way navigation ring.

13. A computer readable storage medium with instructions stored thereon, the instructions when executed by a processor of a handheld computing device causes the processor to:
  perform a function in response to activating one of a plurality of switches for less than a predetermined time period;
  transmit a switch identifier corresponding to the switch in response to the one of the plurality of switches activated for a predetermined period of time;
  store sets of application identifiers, each set of application identifiers corresponding to each switch identifier;
  retrieve a set of application identifiers in response to receiving the transmitted switch identifier, each application identifier corresponding to an executable;
  render a menu on the screen of the mobile computing device in response to retrieving the set of application identifiers, the menu including the set of application identifiers within a bounded area, wherein the set of application identifiers are placed in relative orientations corresponding to relative orientations of at least three directions that can be navigated by a navigation mechanism; and
  launch an executable corresponding to a selected application identifier in response to receiving user input at the navigation mechanism indicating a direction corresponding to a relative orientation of the selected application identifier.

14. The computer readable storage medium of claim 13, further comprising instructions that cause the processor to retrieve icons corresponding to the set of application identifiers for displaying in the menu.

15. The computer readable storage medium of claim 13, wherein the bounded area of the menu comprises one of a pie shape or racetrack shape.

* * * * *